July 28, 1942.   H. J. RUCH   2,291,106
MATERIALS TESTING MACHINE
Filed Feb. 18, 1939
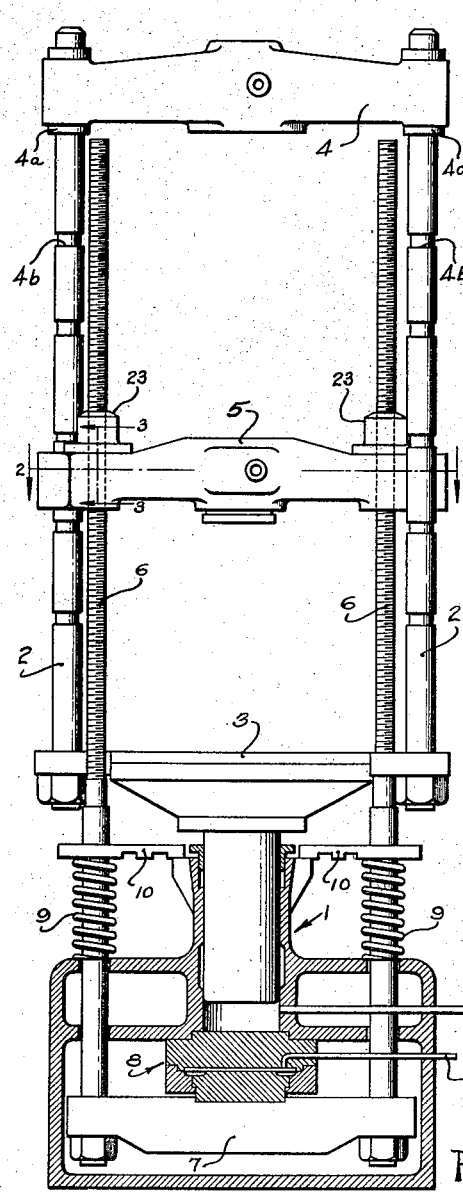
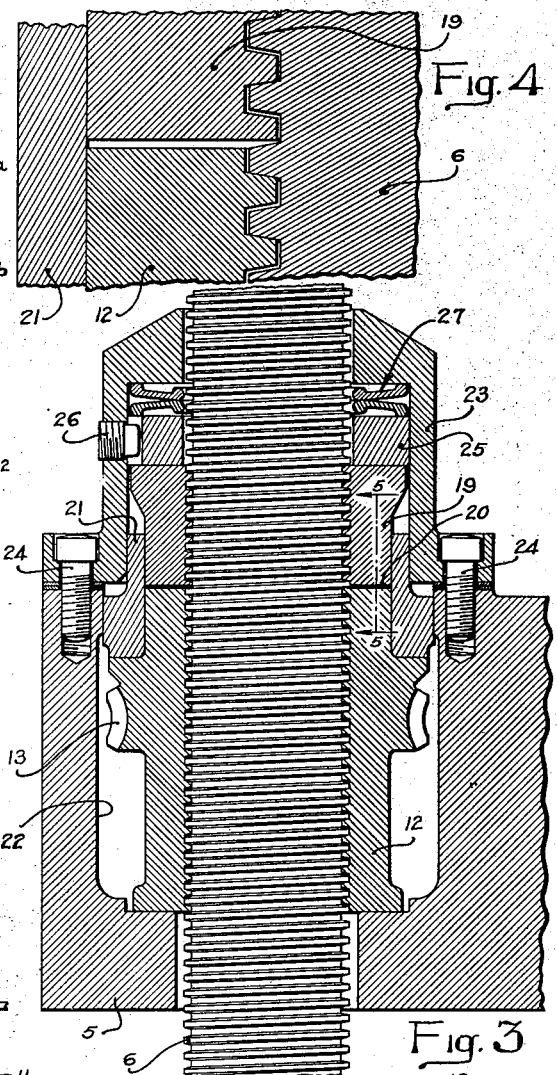
INVENTOR
H. J. RUCH-DEC'D. BY
ELIZABETH B. RUCH
AND FRED J. RUCH-ADMRS
BY
ATTY.

Patented July 28, 1942

2,291,106

UNITED STATES PATENT OFFICE 2,291,106

MATERIALS TESTING MACHINE

Herman J. Ruch, deceased, late of Woodbury Heights, N. J., by Elizabeth B. Ruch, Woodbury Heights, and Fred J. Ruch, Plainfield, N. J., administrators, assignors, by mesne assignments, to The Baldwin Locomotive Works, a corporation of Pennsylvania Application February 18, 1939, Serial No. 257,232

11 Claims. (Cl. 265—12)

This invention relates generally to materials testing machines and more particularly to improved means for insuring uniform loading of a specimen during initial loading thereof.

In materials testing machines a specimen is interposed between two structures usually in the form of crossheads or platens, one of which is supplied with power for loading the specimen and the other of which is sensitive to the load applied to the specimen. These loading and sensitive structures take various forms depending upon the particular type and character of testing machine but in any case the sensitive structure is suitably connected to a load weighing and indicating system of various types. It is also necessary to adjust the distance between the loading and sensitive crossheads in order to accommodate specimens of different lengths.

It has long been known that during initial loading of a specimen in certain types of machines, the load weighing system momentarily pauses notwithstanding that power is continuously supplied to the loading mechanism. This pause has been particularly noticeable in machines employing a low inertia load indicating apparatus such as a Bourdon tube and rotatable pointer or hand, although the pause is also inherently present in other weighing systems of large inertia but usually is not noticeable therein because of the sluggishness incident to large inertia.

It was found that this pause is caused by the fact that the initial loading force transmitted through the specimen is resisted by the dead weight of a crosshead or platen instead of being resisted directly by the entire weighing system and that after passing through a transition period this resisting or reaction force is transferred from the dead weight of the crosshead to the entire weighing system. It is during this transition period that the load indicating hand pauses, thereby signifying that no additional load is being applied to the specimen even though power is continuously supplied to the load producing mechanism.

It is an object of the invention to provide an improved combination for insuring uniform response of a load indicating hand during initial loading of a specimen.

Another object of the invention is to provide an improved combination in a materials testing machine for eliminating dead weight weighing which is particularly present during initial loading but at the same time preserve the ability to adjust the machine for specimens of different lengths.

A further object is to accomplish the foregoing and other objects by an improved arrangement that is simple, compact and rugged in construction and that is easily operated and maintained, but without sacrificing the precision qualities of the testing machine.

Other objects and advantages will be more apparent to those skilled in the art from the following description of the accompanying drawing in which:

Fig. 1 is a side elevation of one form of materials testing machine embodying the invention.

Fig. 2 is a horizontal section taken substantially on the line 2—2 of Fig. 1 to show the operating means for rotatable nuts which are part of one form of mechanism for adjusting the machine to accommodate specimens of different lengths;

Fig. 3 is an enlarged vertical section of one end of the sensitive frame to show details of construction in one specific form of my invention as applied to the rotatable nuts, this view being taken substantially on the line 3—3 of Fig. 1;

Fig. 4 is an enlarged fragmentary section to show the relation between the threads of the side rods to the nuts when under the influence of my improved arrangement; and Fig. 5 is a vertical section taken substantially on the line 5—5 of Fig. 3.

In the particular embodiment of the invention, such as is disclosed herein merely for the purpose of illustrating one specific form among possible others that the invention might take in practice, Fig. 1 shows a materials testing machine of the type disclosed in Emery Patent 1,848,468, although it will of course be understood that the invention is equally applicable to other types and arrangements of materials testing machines involving the same general problem here dealt with. In this particular machine a hydraulic ram and cylinder generally indicated at 1 operates a loading frame comprising side rods 2, a lower loading platen 3 and an upper crosshead 4. This crosshead is supported on collars 4a receivable in any one of a series of annular grooves 4b for the purpose of making large increments of adjustment for specimens of considerable difference in length. A so-called sensitive crosshead 5 is disposed between crosshead 4 and platen 3 and is connected to a sensitive frame including a pair of threaded side rods 6 and a lower crosshead 7, this crosshead bearing upwardly against a hydraulic weighing support generally indicated at 8. Preloading springs 9 and stay plates 10 complete this well-known form of machine together with a suitable doad indicating dial and hand (not shown) operated by fluid pressure through a pipe 11 connected to the hydraulic support 8. A compression specimen is interposed between opposed platens or crossheads 3 and 5 while a tension speimen is interposed between crossheads 4 and 5. The main ram is moved upwardly to apply load to the specimen upon supply of pressure fluid to cylinder 1 from any suitable source such as a pump.

Crosshead 5 is usually adjustably supported on threaded rods 6 through nuts such as 12, Fig. 3, thereby to effect small incremental adjustments. These nuts are suitably rotatably supported within each end of crosshead 5 and are usually provided with worm gears 13 adapted to be rotated by a pair of worms 14 and 15, these worms being secured to a common shaft 16 which is rotated manually or by an electric motor 17. The motor 17 and shaft 16 are carried by and movable with the crosshead.

Heretofore the dead weight of the crosshead 5 normally caused it to rest on the upper side of the threads on the side rods, any clearance present being on the top of the threads. Hence, when load is initially applied to a specimen by applying an upward force to either loading platen 3 or crosshead 4, the specimen load will be transmitted to sensitive crosshead 5. The loading of the specimen will be continuously increased during which time the dead weight of crosshead 5 will constitute the sole resisting or reaction force for the specimen. During such loading, the crosshead 5 moves minutely upwardly and the springs 9 cause side rod 6 to follow up such movement with the result that the crosshead is still supported on the upper surfaces of the threads on the rods. Upward movement of the side rod 6 causes the hydraulic support to be compressed and actuate the load indicating hand in proportion to the amount of the load. However, after the specimen is loaded to the full extent of the dead weight of crosshead 5, then continued supply of operating fluid to the loading cylinder 1 will cause the loading ram to move the specimen upwardly together with the crosshead 5 so that the latter is lifted away from the supporting surfaces of the threaded rods and is moved through the clearance space into contact with the under surfaces of the threads on the side rods. During the foregoing free movement of the crosshead to take up the clearance space, the load indicating hand does not move because the read weight of crosshead 5 monmentarily constitutes the limit of any reaction force on the specimen. In other words, the load on the specimen remains constant during this transition period and cannot be increased because there is no structural means for offering an increasing reaction force. After the clearance space has been take up, the reaction force on the specimen is transmitted through crosshead 5 directly to the under surface of the threads on side rod 6, and thence to hydraulic support 8. Thus it is seen that during initial loading, the specimen is weighted by a dead weight and this is followed by transferring the weighing operation directly to the entire weighing system.

To overcome the foregoing difficulty, this invention provides an improved relation of parts that completely eliminates any possibility of imposing a dead weight load on the specimen and at the same time does not interfere with the flexibility of adjustment of the machine in adapting it to specimens of different lengths. To illustrate one specific application of the improved principles, the invention provides a secondary nut 19 having a radial tongue and groove connection 20 with the upper end of the power driven adjusting nut 12. The construction is deuplicated at each end of the crosshead and hence a description for one will suffice. To maintain the nutes 19 and 12 in proper lateral relation to the crosshead 5, a collar 21 is closely fitted within the upper end of a recess 22 containing nut 12, while the upper reduced end of sleeve 21 is suitably fitted within a cap 23 which is secured to crosshead 5 by cap screws 24. A relatively heavy annular washer 25 is supported on top of secondary nut 19 and is held against rotation by a suitable slot and threaded pin arrangement 26. A spring construction generally indicated at 27 is interposed between washer 25 and the upper end of cap 23. The springs comprise preferably a pair of identical annular elements slightly dished so that when placed back to back their outer rims bear against both the washer 25 and the end of the cap 23 while their inner ends engage each other.

Broadly, the collars 4a provide a supporting surface on which the loading crosshead 4 rests by gravity while the under surface of the threads on side rods 6 provide a supporting surface against which the crosshead 5 is held upwardly against gravity, this being specifically through the medium of nuts 19.

*Operation.*—The springs 27 force nut 19 downwardly on to the upper surface of the threads of rod 6 and force the cap 23 and crosshead 5 upwardly through bolts 24 thereby causing threads on nut 12 to bear upwardly against the under surface of the threads on rod 6. The nuts are thus forced in opposite directions so that one nut serves as a reaction member for the other nut. In the specific arrangement herein, the secondary nuts are placed above the adjusting nuts and hence these nuts are forced toward each other but broadly are moved relative to each other whereby they are simultaneously operative to support the dead weight and to transmit load forces instantly between the threaded side rods and the crosshead thereon. Upon initially loading a specimen, the crosshead 5 will instantly transmit the loading force to the threads on rods 6 without having the dead weight of crosshead 5 function in the prior art manner as heretofore explained. Hence, there is no opportunity for a momentary pause in the load indicating hand during initial loading of the specimen. This improved result is accomplished without imposing any restriction on the adjustable characteristics of nuts 12 and without interfering in any way therewith inasmuch as rotation of nuts 12 will cause secondary nuts 19 to be rotated therewith through the tongue and groove connection 20.

From the foregoing specific disclosure, it is seen that broadly, the loading crosshead 4 and sensitive crosshead 5 have the same physical relation to their respective side rods during no load as exists during full load, thereby insuring uniform loading and weighing conditions in the machine structure throughout the entire load range thereof. Or expressed otherwise, at all times one of the crossheads is maintained by gravity in its normal physical relation to the side rods for full loading whereas the other crosshead is artificially maintained against gravity to establish its normal full loading relation to its side rods, these conditions being obtained while retaining the large and small incremental adjustments of the respective crossheads. Aside from the foregoing functional advantages in eliminating dead weight weighing the specific arrangement, shown herein for purposes of illustration, is highly compact and simple in its construction and operation.

It will of course be understood that various changes in details of construction and arrangement of parts may be made by those skilled in the art without departing from the spirit of the invention as set forth in the appended claims.

It is claimed:

1. A materials testing machine comprising, in combination, a loading member and a sensitive member, two sets of vertical side rods, one of said sets supporting one of said members and the other set for supporting the other member whereby said members are disposed in opposed vertically spaced relation for engaging a specimen, power means for applying load to said loading member to effect relative vertical movement between said members, a load weighing mechanism including said sensitive member, adjustable means whereby the distance between said specimen engaging members may be varied to accommodate specimens of different lengths, and means self-contained with the side rods which support said sensitive member for rendering the dead weight thereof ineffective in resisting the loading force on a specimen throughout loading thereof whereby the initial loading is transmitted continuously and directly from the specimen through said sensitive member to the load indicating mechanism.

2. A materials testing machine comprising, in combination, a vertically extending loading frame having a specimen transverse engaging member, a sensitive weighing frame having vertically extending threaded side rods and a crosshead supported thereon for engaging a specimen in opposed relation to said loading crosshead, power means for applying load to said loading frame, rotatable nuts carried by said sensitive crosshead for adjustably supporting the same on said threaded side rods, and means vertically supported on said side rods so as to be bodily movable therewith and to continuously bias said sensitive crosshead in the direction of force applied to a specimen thereby to render the dead weight of said sensitive member ineffective in resisting the loading force on a specimen throughout loading thereof.

3. A materials testing machine comprising, in combination, a vertically extending loading frame having a cross member, a sensitive weighing frame having vertically extending threaded side rods and a sensitive crosshead, power means for applying load to said loading frame, nuts carried by said sensitive crosshead for supporting the same upon said threaded side rods, means for rotating said nuts to adjust the sensitive crosshead, and means self-contained with said side rods so as to be bodily movable therewith including secondary nuts on said threaded side rods for acting on the threads thereof in a direction opposed to the action of said adjusting nuts whereby the dead weight of said sensitive cross member is rendered ineffective in resisting the loading force on a specimen throughout loading thereof.

4. A materials testing machine comprising, in combination, a vertically extending frame having a transverse specimen engaging member, another frame having vertical threaded side rods, a transverse specimen engaging cross member having adjustable nuts on said threaded rods for vertically adjusting said cross member thereon, secondary nuts on said threaded rods, and means including springs for urging said adjusting and secondary nuts toward each other whereby the dead weight of the cross member supported thereby is rendered ineffective during loading of a specimen.

5. A materials testing machine comprising, in combination, a vertical loading frame having a specimen engaging cross member, a second vertical frame having threaded side rods and a specimen engaging cross member, said frames being relatively movable to apply load to a specimen, rotatable nuts associated with said second cross member for supporting the same on said threaded side rods, secondary nuts on said threaded rods, means for rotatably connecting both of said nuts together while allowing the same to have relative axial movement between each other, and means for urging said nuts toward each other so as to render the dead weight of said second cross member ineffective throughout loading of a specimen.

6. A materials testing machine comprising, in combination, a vertical frame having a specimen engaging cross member, a second vertical frame having threaded side rods and a specimen engaging cross member, said frames being relatively movable to apply load to a specimen adjusting nuts associated with both the second cross member and the threaded side rods, means for adjusting said nuts to vary the position of said second cross member along the axes of said threaded rods, secondary nuts on said threaded side rods, said secondary nuts being associated with said adjusting nuts so as to be rotatable therewith but adapted to have axial movement relative thereto, yieldable means for urging said adjusting and secondary nuts relative to each other so that one is supported on the underside of the threads of the side rods and the other nut is supported on the top side of the threads thereof.

7. The combination in a materials testing machine of the type having vertical frames respectively provided with opposed crossheads between which a specimen is disposed so that a test load may be applied upon relative vertical movement between said frames and one of said frames having threaded side rods for supporting its crosshead and a set of nuts on said threaded rods for adjusting the vertical position of said latter crosshead comprising, a second set of nuts on said threaded rods, means for causing said adjusting nuts and said second set of nuts to maintain a predetermined angular relation to each other, and yieldable means for causing the two sets of nuts to be simultaneously operative to prevent the dead weight of said adjustable crosshead being supported by a specimen at any time during a test and to transmit load forces instantly between said adjustable crosshead and the threaded side rods.

8. A materials testing machine comprising, in combination, opposed crossheads between which a specimen is disposed so that a test load may be applied upon relative vertical movement between said crossheads, threaded side rods and nuts thereon for adjustably supporting one of said crossheads, and means for yieldably urging said nuts into firm contact with the under surface of the side rod threads and for urging the adjustable crosshead into direct contact with the underside of said nuts, whereby instantaneous transmission of load forces occurs between the crosshead and threaded side rods throughout a testing operation.

9. A materials testing machine comprising, in combination, opposed crossheads between which a specimen is disposed so that a test load may be applied upon relative vertical movement between said crossheads, threaded side rods and nuts thereon for adjustably supporting one of said crossheads, means including a second set of nuts on said side rods for yieldably urging said adjusting nuts into firm contact with the under surface of the side rod threads and for urging the adjustable crosshead into direct contact with the underside of said adjusting nuts whereby instantaneous transmission of load forces occurs between the crosshead and threaded side rods throughout a testing operation, and means whereby said adjusting nuts and said second nuts are both rotatable so as to maintain said yieldable means operative throughout vertical adjustment of the adjustable crosshead along said threaded rods.

10. A materials testing machine comprising, in combination, opposed crossheads between which a specimen is disposed so that a test load may be applied upon relative vertical movement between said crossheads, threaded side rods each having two nuts thereon one above the other, the lower one of said nuts being adapted to adjustably support one of said crossheads when a test load is applied thereto, yieldable means supported by the upper nuts, and a structure connected to said adjustable crosshead and overlying said yieldable means so as to be supported thereon whereby the yieldable means exerts an upward force on said adjustable crosshead to raise the same together with raising the lower set of nuts until the latter nuts are in firm contact with the under surface of the side rod threads thereby allowing instantaneous transmission of load forces between the crosshead and threaded side rods throughout a testing operation.

11. A materials testing machine comprising, in combination, a vertical loading frame having a specimen engaging cross member, a second vertical frame having threaded side rods and a specimen engaging cross member, said frames being relatively movable to apply load to a specimen, rotatable nuts associated with said second cross member for supporting the same on said threaded side rods, secondary nuts on said threaded rods, means for rotatably connecting both of said nuts together while allowing the same to have relative axial movement between each other, and means for urging said nuts relative to each other so as to render the dead weight of said second cross member ineffective throughout loading of a specimen.

ELIZABETH B. RUCH.
FRED J. RUCH.
*Administrators of the Estate of Herman J. Ruch, Deceased.*

CERTIFICATE OF CORRECTION.

Patent No. 2,291,106. July 28, 1942.

HERMAN J. RUCH, DECEASED, BY
ELIZABETH B. RUCH, ET AL., ADMINISTRATORS.

It is hereby certified that error appears in the printed specification of the above numbered patent requiring correction as follows: Page 2, first column, line 1, for "doad" read --load--; line 6, for "speimen" read --specimen--; line 55, for "read weight of crosshead 5 monmentarily" read --dead weight of crosshead 5 momentarily--; line 67, for "weighted" read --weighed--; and second column, line 7, for "deuplicated" read --duplicated--; line 9, for "nutes" read --nuts--; page 3, first column, line 39, claim 2, for "specimen transverse" read --transverse specimen--; and that the said Letters Patent should be read with this correction therein that the same may conform to the record of the case in the Patent Office.

Signed and sealed this 29th day of September, A. D. 1942.

(Seal)

Henry Van Arsdale,
Acting Commissioner of Patents.